United States Patent  [15] 3,645,793

Hein et al.  [45] Feb. 29, 1972

[54] METHOD FOR PRODUCING POROUS METAL BATTERY ELECTRODE STRUCTURE

[72] Inventors: Edward R. Hein, Doylestown; William E. Veit, Ivyland, both of Pa.

[73] Assignee: ESB Incorporated

[22] Filed: June 1, 1970

[21] Appl. No.: 41,883

[52] U.S. Cl. .................................136/24, 136/30, 136/126, 264/111
[51] Int. Cl. .........................................H01m 13/08
[58] Field of Search ...................136/24, 21, 30, 29, 76, 120, 136/125–126, 130, 120, 95, 102; 264/111; 75/211, 214, 222; 29/192

[56] References Cited

UNITED STATES PATENTS

| | | | |
|---|---|---|---|
| 2,501,673 | 3/1950 | Glassner | 136/130 |
| 3,322,535 | 5/1967 | Rao | 75/201 |
| 3,337,336 | 8/1967 | Rao | 75/201 |
| 3,348,976 | 10/1967 | Kelly et al. | 136/125 |
| 3,378,369 | 4/1968 | Smith | 75/206 |
| 3,380,822 | 4/1968 | Kelly et al. | 75/214 |
| 3,384,482 | 5/1968 | Kelly et al. | 75/201 |
| 3,413,116 | 11/1968 | Rao | 75/212 |
| 3,418,113 | 12/1968 | Rao | 75/214 |

Primary Examiner—Anthony Skapars
Attorney—Alfred J. Snyder, Jr., Robert H. Robinson, Raymond L. Balfour and Anthony J. Rossi

[57] ABSTRACT

A method for the preparation of highly porous metallic battery electrode structures by the action of pressure alone without the application of heat is described in which the surface of the powders used for the compact is cleaned by the action of mild acids prior and during the pressing operation. In a first modification, a mixture of metallic powder, a powdered nonreactive pore-forming agent and a mild acid are pressed to form a porous structure. In a second modification, a mixture of metallic powder and a powdered slightly soluble mild acid are pressed to form a porous structure. In the two modifications the pore former is removed after the pressing operation.

7 Claims, 1 Drawing Figure

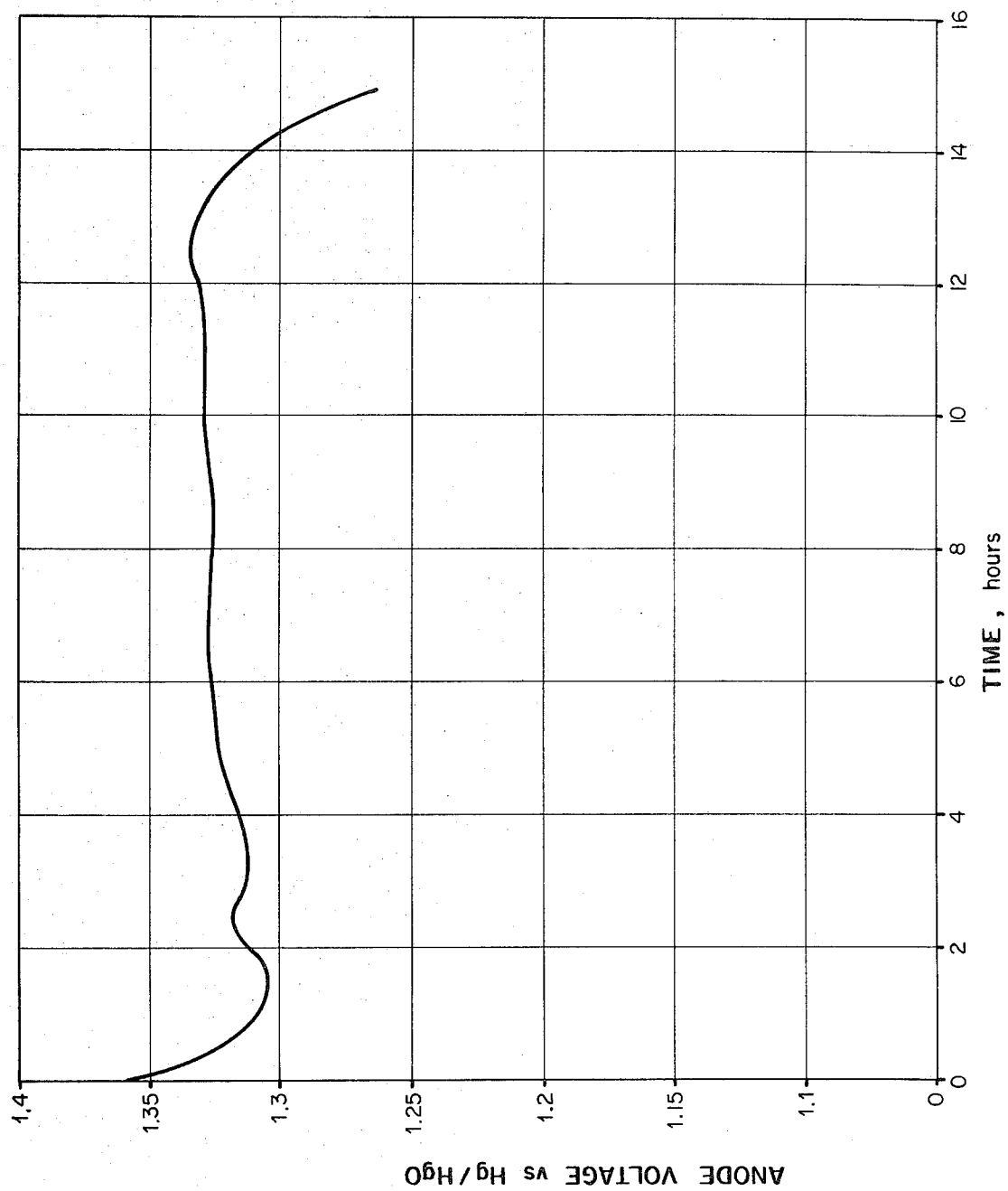

METHOD FOR PRODUCING POROUS METAL BATTERY ELECTRODE STRUCTURE

BACKGROUND OF THE INVENTION

1. Field of the Invention

This invention is directed to electrode structures for use in battery cells. In particular, it describes porous electrodes of the consummable and nonconsummable type for use in primary and secondary cell types.

2. Description of the Prior Art

Porous metallic structures are used extensively as electrodes in many forms of primary and secondary electrochemical batteries.

Experimenters have found that zinc and cadmium powders, although very desirable as electrode materials, cannot be converted by the ordinary metal powder fabrication techniques of pressing and sintering to porous structures having a high porosity. For example, metallic zinc powders cannot be converted to a unified highly porous structure by the single or joint action of heat and pressure. Nor has it been possible to produce the desirable porous structures by the action of heat and pressure in the presence of a reducing gas such as hydrogen. The same remarks are true of cadmium powders. Compacts can be made by pressing techniques having porosities up to say 10 percent. When compacts are made at lower pressures to give greater porosity, they have little or no strength and are not suitable for battery electrode purposes.

Metallic cadmium and zinc powders form a minute surface coating of oxide upon exposure to air. This thin layer serves to protect the metal from further oxidation. However, it also prevents the metal, for example, in powder form, from adhering to itself.

If the powders are compacted at a sufficient pressure, the oxide coating will be broken to form a structure. However, this pressure is so great that the particles are distorted and the structure has a low porosity.

The oxide layer can be removed by the chemical reaction between hydrogen and oxygen at a suitable temperature. Unfortunately, the temperature at which this reaction takes place is, in the case of zinc or cadmium, well above the melting point of the metal. Because of this, the reaction with hydrogen cannot be used to form porous zinc or cadmium structures.

Accordingly, since ordinary powder fabrication techniques cannot be resorted to to produce the porous metallic electrode structures of the type here contemplated, other methods of preparation have been developed.

A common method for preparing porous zinc electrodes involves making a paste of zinc oxide with or without binding agent, smearing this mix onto a metallic conductive grid, drying the plate and then converting it to zinc by electrolysis. In general, it has been found that it is difficult to make thick structures (on the order of one-twentieth of an inch thick or thicker) by this process.

In another method which has been proposed for the formation of porous zinc structures, zinc powder is mixed with a poreforming powder which consists of an ammonium halide salt. The halide salt is removed by sublimation at a chosen elevated temperature and under vacuum.

At the temperature chosen, the ammonium halide salt reacts with the oxide layer in a dry reaction cleaning the surface of the metal. The temperature is sufficiently high to permit sintering of the metal particles and results in a desirable, highly porous, mechanically strong structure. This method suffers from the complications of vacuum sublimation and the attendant problems of collection and control of a vaporized halide salt as well as a sintering operation at reduced pressure.

SUMMARY OF THE INVENTION

In accordance with this invention, zinc or cadmium metal powder is mixed with a water solution of an ozide dissolving acid and pressed to give a strong porous metallic electrode structure.

In a first modification, a nonreactive pore-forming agent such as napthalene is incorporated in the mix.

In a second modification, a slightly soluble acid such as benzoic acid is used as combined cleaning agent and pore former.

In a third modification, a mercury salt of the cleaning or other acid is added to the solution to give an evenly divided mercury coating to the porous metal structure.

DISCUSSION OF THE INVENTION

In the first embodiment of this invention, zinc or cadmium metal powder of suitable size is mixed with a sufficient quantity of an acid which will rapidly dissolve the metal oxide but which reacts only slowly with the base metal, such as acetic, benzoic, tartaric or weak hydrochloric acid to wet all particles and form a slurry. The slurry is spread out in a pressing die and pressed at a pressure between about 800 and 20,000 pounds per square inch to form a porous metal structure. It is found that compacts pressed at high pressure will have all the aqueous solution removed by the compaction of the powder. However, compacts not pressed as hard will contain some residual solution. These latter compacts are therefore promptly washed in water and dried. To prepare an electrode, a conductor is attached. Alternately, a conductor can be placed in the pressing die prior to the pressing operation. The porosity of the finished plate will be determined principally by the mixture of powder size range, the powder particle shape and the pressing pressure as is known to the art. The greater the compacting pressure, the lower the porosity and the stronger the electrode. Porosities from near zero to about 45 percent can be produced by this method.

In the second embodiment and in order to get a higher degree of porosity, a pore forming agent is dry mixed with the metallic powder prior to the addition of the oxide removing solution. The pore forming agent permits the use of a high-compacting pressure with consequent strong bonding of the metal powder particles. The pore-forming agent must be insoluble and unreactive in the cleaning acid, it should have a uniform particle size and it must be readily removable from the finished electrode. Further, it must be capable of flow under pressure and must tend to bond with itself under pressure to form tendrils which will become connecting pores when it is removed from the structures. Finally, it must not coat the metal particles or otherwise prevent metal-to-metal contacts. A suitable material for this purpose is napthalene, although other functionally equivalent materials will be suggested to one skilled in the art.

To complete the electrode, the dry mix or pore former and metal powder is treated with a solution of the oxide dissolving acid. The resulting slurry is then spread out in the pressing die, pressed and washed. The napthalene can be washed out of the finished electrode by the use of solvent such as benzene. It also can be removed by evaporation at a temperature of about 70° C. and a reduced pressure of about 5 mm. mercury absolute. Electrodes of satisfactory strength and having porosities up to perhaps 75 percent have been produced by this means.

In order to simplify the processing, a pore former can be chosen which is an acid and is only slightly soluble. Benzoic acid is typical of this class. A dry mix of metal powder and benzoic acid is made. It is then wet with water, placed in a suitable die and pressed. After pressing, the benzoic acid can be removed by washing with hot water or by solvent.

It is well known in the art that for some services, it is highly desirable to coat the surface of zinc electrodes with mercury. In the case of this invention, mercury can be chemically coated on the zinc surface by including, for example, a mercury salt of the cleaning acid in the acid solution. The mercury will be precipitated from the solution by chemical displacement. It is not actually necessary to use the salt of the cleaning acid and in the case of the slightly soluble acid pore formers, the mercury salts may not be sufficiently soluble. Therefore, in this embodiment of the invention, other mercury salts are desirable.

This method of mercury addition has the advantage over other methods of mercury addition of giving a very uniform apportioning of the mercury over the entire active surface of the electrode. The calculations for determining the correct amount of mercury salt to supply a given amount of mercury to the plate are well known and therefore are not included in this specification.

It is normally not necessary to add mercury to porous cadmium electrodes.

Some typical examples of several of the embodiments of the invention and an example of the behavior of a typical battery electrode prepared in accordance with the invention follow.

EXAMPLE 1

20 grams of 40 mesh zinc powder was mixed with 2.5 ml. of 20 percent acetic acid. The mixture was pressed in a die at 800 p.s.i. The resulting compact had a porosity of 44 percent. It had good structural strength and could be readily handled.

EXAMPLE 2

20 grams of 40 mesh zinc powder was mixed with 2.5 ml. of 20 percent acetic acid. The mixture was pressed in a die at 4,000 p.s.i. The resulting compact had a porosity of 41.5 percent. It was strong and could be readily handled.

EXAMPLE 3

5.5 grams of plus 40 mesh cadmium filings was mixed with 2.7 ml. of 20 percent acetic acid. The mixture was pressed in a die at 4,875 p.s.i. The resulting compact had a porosity of 30.6 percent. It had good structural strength and could be readily handled.

EXAMPLE 4

5.5 grams of plus 40 mesh cadmium filings was mixed with 2.2 ml. of 20 percent acetic acid. The mixture was pressed in a die at 3,250 p.s.i. The resulting compact had a porosity of 37.6 percent. It was strong and could be readily handled.

EXAMPLE 5

5 grams of −50+200 mesh zinc powder was mixed with 0.1 gms. of powdered tartaric acid and sufficient water to make a paste. The paste was placed in a die and pressed at 4,875 p.s.i. The resulting compact had a porosity of 37.8 percent. It had good structural strength and could be readily handled.

EXAMPLE 6

5 grams of −325 mesh zinc powder was mixed with 0.1 grams of powdered benzoic acid. Sufficient water was added to make a paste. The paste was placed in a die and pressed at 4,875 p.s.i. The resulting compact had a porosity of 33.5 percent. It was strong and could be handled.

EXAMPLE 7

5 grams of −325 mesh zinc powder was mixed with 1.5 gms. of powdered benzoic acid. Sufficient water was added to make a paste. The paste was placed in a die and pressed at 4,875 p.s.i. The remaining benzoic acid was leached out of the compact in hot water. The resulting compact had a porosity of 67 percent. Some loss in strength was noted but the compact could still be handled.

EXAMPLE 8

10 grams of −50+200 mesh zinc powder was mixed with 2 ml. of a solution of 20 percent acetic acid containing 200 g. per liter of mercuric acetate. The mixture was placed in a die and pressed at 4,000 p.s.i. The resulting compact was completely amalgamated and had a porosity of 37.6 percent. It had good structural strength and could be readily handled.

EXAMPLE 9

24 grams of −40+200 mesh zinc powder was mixed with 9 g. of flake naphthalene in a jar mill for 1 hour. 9.5 ml. of 20 percent acetic acid containing 200 g. per liter of mercuric acetate was then added. The mixture was placed in a die and pressed at 20,000 p.s.i. The resulting compact was removed from the die and heated at 70° C. under a vacuum of 27 inches of mercury for 3 hours. This removed all traces of naphthalene. The resulting structure was strong. It had a porosity of 70 percent.

EXAMPLE 10

22 grams of −40+200 mesh zinc powder was mixed with 7 grams of flake naphthalene in a jar mill for one hour. 8 ml. of 20 percent acetic acid containing 200 g. per liter of mercuric acetate was then added. The mixture was placed in a die and pressed at 20,000 p.s.i. The resulting compact was removed from the die and the naphthalene was washed out by refluxing in trichlorethane. The porous compact formed in this way was strong and had a porosity of 65 percent.

EXAMPLE 11

220 grams of −40+200 mesh zinc powder was mixed with 70 g. of flake naphthalene in a jar mill for 1 hour. 80 ml. of 20 percent acetic acid containing 200 g. per liter was then added to the dry mix. The wet mixture was placed in a die and pressed at 4,500 p.s.i. Some liquid was forced from the die. There was no readily detectable mercury in this liquid. The compact was then removed from the die and heated at 70° C. under a vacuum of 27 inches of mercury for 3 hours. This removed all traces of naphthalene. The resulting structure was strong and had a porosity of 66.5 percent.

EXAMPLE 12

15.4 grams of −40+200 mesh zinc powder was mixed with 2.5 ml. of 2.5 N HCl. The wet mixture was placed in a die and pressed at 4,875 p.s.i. The compact had a porosity of 37 percent and had good structural strength.

EXAMPLE 13

11 grams of −40+200 mesh zinc powder was mixed with 3.7 g. of naphthalene in a ball mill for 1 hour. To this dry mix 3 ml. of 2.5 N HCl was added. The wet mix was placed in a die and pressed at 16,000 p.s.i. The naphthalene was removed from the compact by heating at 70° C. under a vacuum of 27 inches of mercury for 3 hours. The resulting structure was strong and had a porosity of 63 percent.

EXAMPLE 14

As an example of the use of these electrodes, an electrode was fabricated in accordance with Example 9. The electrode was 2.5 inches by 1.5 inches by 0.20 inch thick. Its porosity was 70 percent, its weight 24.95 g. and its theoretical capacity 20.2 AH. It was discharged at 1.25 amperes against an auxiliary electrode in 27 percent KOH. A total of 16.9 ampere hours was withdrawn from the electrode with an ampere hour efficiency of 87.9 percent. The discharge voltage-time curve is shown in the accompanying drawing. The slight rise in voltage during the discharge is due to the effect of a rising concentration of potassium zincate in the electrolyte on the mercury-mercuric oxide reference electrode.

Having fully described our invention and given examples of its embodiments and its utility, we claim:

1. A method for preparing porous metal structures for battery electrodes from a material that is not readily sinterable wherein the material is cadmium or zinc which comprises:
   a. mixing the metal in powder form with an aqueous solution of an acid selected from the group which consists of acetic acid and hydrochloric acid to produce a slurry;
   b. placing the slurry in a form; and
   c. pressing the slurry in the form at a pressure between 800 and 20,000 p.s.i.

2. A method as defined in claim 1 in which the metal is zinc and a mercury salt of the acid is mixed with the acid solution.

3. A method for preparing porous metal structures for battery electrodes from a material that is not readily sinterable wherein the material is cadmium or zinc which comprises:
   a. mixing the metal in powder form with a powdered pore forming agent with the characteristics of insolubility, unreactiveness in water solution, and capable of flow and self-bonding under pressure to form a dry mix;
   b. adding to the dry mix an aqueous solution of an acid selected from the group which consists of acetic acid and hydrochloric acid to form a slurry;
   c. placing the slurry in a form;
   d. pressing the slurry in the form at a pressure between 800 and 20,000 p.s.i.; and
   e. removing the pore-forming agent.

4. A method as defined in claim 3 in which the metal powder is zinc and a mercury salt of the acid is mixed with the acid solution.

5. A method as defined in claim 3 in which the pore former is powdered napthalene.

6. A method for preparing porous metal structures for battery electrodes from a material that is not readily sinterable wherein the material is cadmium or zinc which comprises:
   a. mixing the metal in powder form with a dry slightly soluble organic acid selected from the group consisting of benzoic acid and tartaric acid;
   b. adding water to the dry mix to form a slurry;
   c. placing the slurry in a form;
   d. pressing the slurry at a pressure between 800 and 20,000 p.s.i.; and
   e. removing the residual organic acid.

7. A method as defined in claim 5 in which the metal powder is zinc and a mercury salt is added to the components of the slurry.

* * * * *